United States Patent
Sakai

(10) Patent No.: US 6,221,300 B1
(45) Date of Patent: Apr. 24, 2001

(54) METHOD FOR MANUFACTURING ARTIFICIAL STONE

(75) Inventor: Mieko Sakai, Tokyo (JP)

(73) Assignee: Doppel Co., Ltd., Tokyo (JP)

( * ) Notice: Subject to any disclaimer, the term of this patent is extended or adjusted under 35 U.S.C. 154(b) by 0 days.

(21) Appl. No.: 09/171,214

(22) PCT Filed: Feb. 17, 1997

(86) PCT No.: PCT/JP97/00416

§ 371 Date: Dec. 15, 1998

§ 102(e) Date: Dec. 15, 1998

(87) PCT Pub. No.: WO98/35816

PCT Pub. Date: Aug. 20, 1998

(51) Int. Cl.$^7$ .......................... B29C 39/12; B29C 53/04; B29C 53/84

(52) U.S. Cl. .......................... 264/322; 264/500; 264/544; 264/85; 264/162; 264/245; 264/295; 264/297.9; 264/333; 264/339; 425/384; 425/405.1; 425/405.2

(58) Field of Search ..................................... 264/404, 544, 264/162, 245, 295, 297.6, 322, 339, 297.9, 333, 85, 500; 425/405.1, 405.2, 384

(56) References Cited

U.S. PATENT DOCUMENTS

| | | | |
|---|---|---|---|
| 2,168,127 | * | 8/1939 | Kasen . |
| 2,347,320 | * | 4/1944 | Hiltner ................................. 264/500 |
| 3,020,596 | * | 2/1962 | Clapp et al. . |
| 3,670,060 | * | 6/1972 | Cuffaro et al. .......................... 264/77 |
| 5,043,377 | * | 8/1991 | Nogi et al. ............................ 524/437 |
| 5,269,991 | * | 12/1993 | Gueret .................................. 264/73 |
| 5,358,993 | | 10/1994 | Timm et al. .......................... 524/445 |
| 5,364,672 | * | 11/1994 | Schultze-Kraft ....................... 428/15 |
| 5,422,391 | | 6/1995 | Inoue .................................. 524/427 |

FOREIGN PATENT DOCUMENTS

| | | |
|---|---|---|
| 5-24398 | * 2/1993 | (JP) . |
| 5-208445 | * 8/1993 | (JP) . |
| 6-87641 | 3/1994 | (JP) . |

* cited by examiner

Primary Examiner—Jan H. Silbaugh
Assistant Examiner—Michael I. Poe
(74) Attorney, Agent, or Firm—Wenderoth, Lind & Ponack, L.L.P.

(57) ABSTRACT

A method for manufacturing artificial stone having a curved surface or a deformed shape including the steps of heating a plate-like artificial stone forming body, whose surface has previously been polished or roughened, to a temperature ranging from 120° C. to 200° C. under a pressurized atmosphere equal to or higher than 3 atms so as to soften and deform it to a predetermined curved surface or deformed shape and cooling it to a temperature not higher than 90° C.

5 Claims, 1 Drawing Sheet

METHOD FOR MANUFACTURING ARTIFICIAL STONE

TECHNICAL FIELD

The invention of this application relates to a method for manufacturing artificial stone. More particularly, the invention of this application relates to a method for manufacturing artificial stone useful as wall materials, other building materials, and furniture materials, having good feel of granite tone, marble tone, etc., and good characteristic properties of surface hardness, wear resistance, etc., light in weight and good in strength, and formed in a curved surface or deformed shape.

BACKGROUND ART

Hitherto, a method of crushing natural stone in adequate size, mixing this with a resin, etc., casting this into a mold frame and hardening, and grinding and fabricating, according to need, into artificial stone has been known. And, regarding such artificial stone, various approaches have been taken with respect to the formulating ratio of components of resin, etc., and natural stone, the nature these components, and the conditions for production such as depressuring and pressuring or temperature control.

For example, regarding resin to be mixed with crushed product of natural stone, using unsaturated polyester and methyl methacrylate (MMA) resin has been proposed, and regarding the entire composition, artificial stone composed of an inorganic particle component of large particle diameter and an inorganic fine particle component of small particle diameter, and a resin component of a small ratio lower than 15 wt % of the total amount, has also been developed by the inventor of this application.

In the case of this newly developed artificial stone, making the best used of the feature that the amount of the resin component used as the binder is small and using a fine particle body of natural stone, etc., a product having a dense structure, a color tone with a transparent feel and a color tone with a deep feel, and yet being superior in moldability despite the small amount of the resin component, capable of being molded into arbitrary shapes, has been obtained.

However, despite such conventional approaches, regarding the molding of artificial stone to curved surfaces and the molding to more complex deformed shapes, areas to be improved remain.

The reason for this is that regarding the curved surface molding (R-type molding), for example, the method of casting into a curved-surface-like mold and hardening, and polish-fabricating afterward, and the method of polish fabricating after the cutting out by R-shaped slice fabrication are known, but the polish fabrication of the curved surface state is very expensive, raising the product price, and preventing widespread practical use.

As an improved method, a method of heat-softening and bend fabricating after polish fabricating the plate-like forming body has been proposed, but in the conventional methods, a serious defect has occurred that air bubbles remaining inside the forming body and residual monomer of the resin component expand by heating, locally deforms the softened part, and whitens the product.

Similarly, in the conventional technology, there is a problem in that it is impossible to produce artificial stone product formed to curved surfaces and deformed shapes simply at a low cost, without causing deformation and whitening, and there was a need for immediate improvement in this regard.

DISCLOSURE OF THE INVENTION

The invention of this application is one carried out to solve the problem mentioned above, and, as the means to solve the problem, offers a method for manufacturing artificial stone having a curved surface or a deformed shape comprising the steps of heating a plate-like artificial stone forming body whose surface has been polished or roughened to a temperature ranging from 120° C. to 200° C. under a pressurized atmosphere equal to or higher than 3 atms so as to soften and deform it to a predetermined curved surface or deformed shape and cool it to a temperature not higher than 90° C.

The invention of this application also offers a method for installing a pedestal having a predetermined curved surface or deformed shape in a pressurized container, and deforming the forming body which has been softened by heating, to the pedestal shape by its own weight or by supplementary pressing.

BEST MODE FOR CARRYING OUT THE INVENTION

Figure 1:
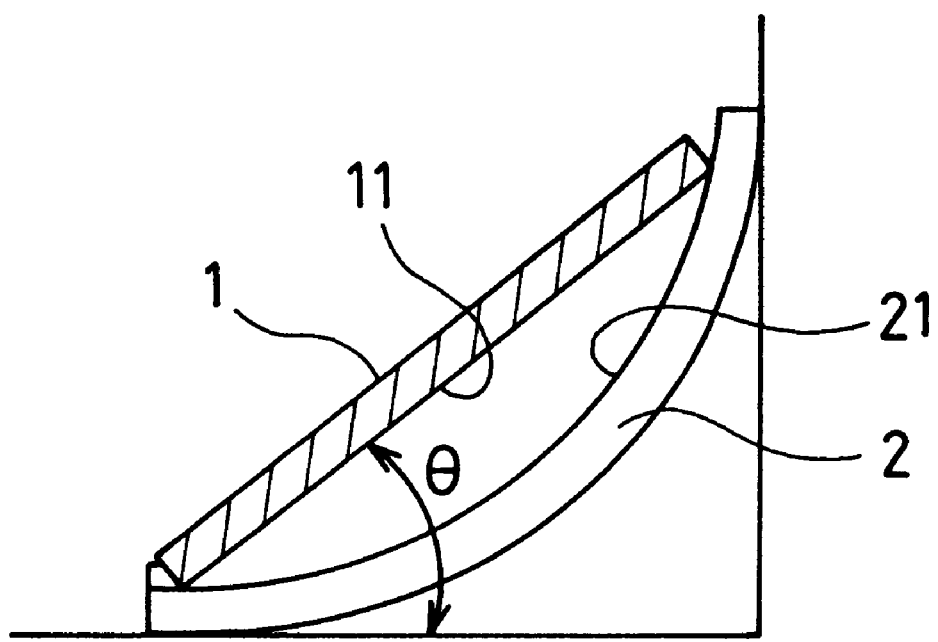
FIG. 1 is a schematic diagram showing an example which uses deformation by the own weight of the forming body and a pedestal therefor, as the method of this invention.

Regarding the invention of this application, an explanation is given in more detail in the following.

In the manufacturing method of this invention, regarding the plate-like forming body of artificial stone, its surface is previously mirror-polished or roughened. And, it follows that the forming body after polishing or roughening is heated and softened under a pressurized atmosphere. The pressurizing atmosphere at this time is indispensable to suppress the expansion or vaporization of air bubbles or residual monomer remaining in the artificial stone, and should be a pressurized atmosphere not lower than 3 atms, more generally, not lower than 3 atms and not higher than about 10 atms. This pressurized atmosphere can be formed by the action of a compressor on the inside of the container.

Such pressurized atmosphere is maintained either when the plate-like forming body which has been polished is softened and deformed by heating to a temperature not lower than 120° C. and not higher than 200° C. or at the time of cooling to a temperature not higher than 90° C. Pressuring can utilize a compressive gas such as air and inert gas, steam etc., as the medium.

Also, as the heating means for softening and deforming, electric heating or heating atmospheric gas are considered. As the electrical means, various methods such as resistance heating, infrared, high frequency, induction heating, etc. are acceptable.

In the softening and deformation by heating, it is possible to install a pedestal having its shape in a pressurized container so that it becomes the predetermined curved surface or deformed shape and cause it to soften and deform by the weight of the forming body which softens or by the use of a means to guide deformation.

For example, FIG. 1 attached hereto is one illustrating the method of softening and deforming by the weight of the forming body, illustrating the case of installing in a pressure container a pedestal (2) having a predetermined curved surface (21), heating and softening a plate-like forming body (1) of artificial stone, and causing the plate-like forming body (1) to deform and mold to the shape of the curved surface (21) installed on this pedestal (2).

The treating surface (11) previously mirror-polished or roughened is caused to oppose the curved surface (21) of predetermined shape of the pedestal (2) and moreover in order that this curved surface (21) as a whole is inclined, the pedestal (2) itself is disposed aslant.

For example, in the case like this method, too, by heating in the pressurized atmosphere, uniform pressure is applied to the forming body (1) to suppress the expansion of bubbles and residual monomer in its inside. And, at the time of cooling after the completion of deformation, whitening in the cooling process is prevented by making it the pressurized atmosphere.

The pressurized atmosphere can be constructed as a pressurized chamber partitioned by rigid walls, and heating means may be arranged at an adequate place of floor, wall, etc., of the pressure chamber, and heated pressuring atmosphere gas may be introduced.

The speed of temperature rise, temperature fall at the time of heating or cooling is not specifically restricted, but not lower than 10° C./min is desirable if productivity is taken into account. It is desirable that the atmosphere pressure be released when the temperature has been lowered to 90° C., preferably when lowered to a temperature not higher than 70° C. at the time of cooling.

Regarding the plate-like forming body (1), in general, its thickness is desirably in the range of 5–30 mm or so, its size can be made about 100×100 mm to 1500×1500 mm.

In the case of using the pedestal (2) as in FIG. 1, its inclined arrangement is effective, its reason is that it is possible to certainly obtain the demanded shape by deforming sequentially from the lower part to which an added weight is applied. Regarding the slope at this time, it is possible to make it a standard that the angle of inclination (6) of the forming body (1) of FIG. 1 becomes about 30–70°.

Incidentally, regarding the pedestal (2), its material may be metal, alloy, ceramics, or heat-resistant resin, or further, an adequate one of their compound material. And the pedestal (2) may be a single one or that of dividable type. In the case of dividable mold, it is permissible to assemble in the stage of using this.

Depending on the size of the capacity of the pressurized atmosphere, it is permissible to place a plurality of, or further a large number of pedestals (2) in this atmosphere and to form curved surface by heating and softening a plurality of plate-like forming bodies (1) at one time.

Regarding the composition itself of the artificial stone, it is possible to make it the one etc. which the inventor of this invention has already proposed.

For example, the raw material constituting the artificial stone of this invention is divided broadly into 3 components. One as the principal component is an inorganic small particle component of the size of 10 to 70 mesh, this being an adequate inorganic small particle component from minerals such as silica stone, olivine, feldspar, pyroxene, and mica, natural stone such as granite and metamorphic rocks, porcelain, glass, metal, etc.

Also, a fine particle component of 100 mesh under is used together with this small particle component. As this fine particle component, natural or artificial various fine particle components are enumerated. For example, calcium carbonate, aluminum hydroxide, etc. are fine particle components that can be obtained easily.

Also, as a part of this fine particle component, it is permissible to add and formulate a component of manganese dioxide, titanium dioxide, zirconium silicate, iron oxide, etc., for the adjustment of color tone, or a component of antimony trioxide, boron compound, bromine compound, etc., to impart flame retardance.

There is a resin component as the third component. The resin component can be selected over a broad range among from thermosetting ones.

For example, acrylic resin, methacrylic resin, unsaturated polyester resin, etc. are exemplified. Among others, methacrylic resin is suitable from the point of clarity, hardness, and strength.

The fine particle component of natural stone etc. functions as an important factor for the external appearance and physical properties of the artificial stone obtained. Especially, on exposing a part, it becomes an important factor of the color and pattern on the external appearance in conjunction of other components.

The fine particle component is considerably smaller, as compared with the small particle component, than the 100 mesh level, and enters between individual particles of the small particle component, so as to fill space among particles and contributes to obtaining such properties as hardness and flexibility of the artificial stone obtained. It is preferable that the small particle component and this fine particle component are 0.5:1 to 5:1 in weight ratio.

Also, the resin component contributes to enclosing these and binding the whole, i.e. the small particle component of natural stone, etc., forming the skeleton mentioned above and the fine particle component, and has the finction of imparting elasticity or tensile strength to the product when the artificial stone is completed.

In this invention, the constitutional ratio of these components is important. What is particularly important is the constitutional ratio of the resin component and other components. In this invention, it is one feature to make possible high-density products having a compact structure, high-density herein implying that the small particle component and fine particle component contained in the product of artificial stone are present at a high density, for example, higher than a density of 2.2 g/cm$^3$, which exceeds the range contained in the conventional artificial stone.

That is, the more the constitutional ratio in the product, of the small particle component of natural stone, etc., which is the skeleton component, the closer to natural stone, however, if too much, it does not become one which has solidified and it is impossible to use as the product. And the physical properties of the product to be obtained are poor and do not endure, when produced by the conventional method.

Also, in addition to the problem of not solidifying even when the fine particle component is used in large amounts, the one obtained is lusterless and something that cannot be called stone.

Therefore, the ratio of the small particle component and fine particle component is restricted. That is, it should be not less than 85%, preferably not less than 90% by weight. Incidentally, in case of more than 95%, the product becomes brittle and it is only possible to obtain a product which is difficult to use. Also, if less than 85%, the product is too soft and the stone-like properties cannot be obtained, the use range becomes one similar to the resin plate.

It follows from this that materials other than the fine particle component and the small particle component of natural stone, etc., or the resin component, should not be present in excess of 15% by weight at most in the product.

When the resin component exceeds 15% or so, the product becomes plastic-like, merely having a nominal outward appearance of natural stone. And, excessively reducing the resin component increases the appearance properties close to natural color of the product, but on the other hand, the product becomes one which is brittle and it becomes unsuitable for use. From this point of view, it is more preferable that the resin component becomes 3 to 10 wt %.

And, in the artificial stone as the product and artificial stone composition of this invention, it is permissible that a portion or whole of the above-mentioned inorganic small particle component may be transparent particles and yet one with its particles or small lumps previously coated with inorganic or organic matter.

Such coating of transparent small particle component is realized by coating and hardening a resin on the surface of its transparent small particle component, or baking and coating an inorganic substance such as water glass, glaze for porcelain, light storing material, and W light luminescent material, or the like. In any case, it should be done such that the coating of several $\mu$m to several tens $\mu$m, for example, 5 to 50 $\mu$m, more preferably 20 to 30 $\mu$m or so, is performed on the particle surface of the transparent small particle component. To be more concrete, for example, using acrylic-based resin, methacrylic-based resin, unsaturated polyester-based resin, coating and hardening these resin compositions on the particle surface of the small particle component by heating 150 to 300° C. or so or irradiating light can be performed, or using water glass, glaze, etc., an inorganic coating can be performed by baking at a high temperature of 800 to 1100° C. or so.

These coatings greatly improve the affinity to the structure entirety of the small particle component functioning as aggregates of the artificial stone. Also, by mixing the fine particle component and the resin component, the strength becomes great and the hardness of the surface becomes good.

The small component utilizes transparent natural stone etc. as mentioned above, and the above-mentioned hard coating is performed on its surface, therefore, when the surface of the artificial stone product is polished, this coating layer is partly broken. Then, it follows that the surface structure of the particles and their surrounding layer of the partly exposed inorganic transparent small particle component obtains a unique effect for the reflection of light.

Thus, it follows that light enters the transparent small particle component, is reflected by the coating of its surrounding, and passes again the transparent small particle component and is reflected. The phenomenon of light passage and reflection like this is essentially different from reflection of only the surface of the conventional artificial stone, imparting the unique deep feel to the artificial stone product of this invention. One obtains marble-like artificial stone of high quality having a massive deep feel.

The transparent small particle component having the coating layer as mentioned above can be made in general a ratio of 10 to 100% in terms of the total amount of the inorganic small particle component to be incorporated into the composition.

Incidentally, in this invention, it is necessary that the size of the inorganic small particle component is also made one which is specific. That is, the inorganic small particle component is made a size of 10 to 70 mesh as mentioned above. In the case etc. where it is desirable to impart a color densely up or down by using one which either has or does not have a color, it is considered to use them by changing the size of particles according to the presence or absence of color, however, the mass use of one having an extreme difference should not be used because it deteriorates the strength of the product.

On the other hand, the size of particles of the fine particle component should be under 100 mesh as mentioned above. It should be one which sufficiently enters between the particles of the small particle component. To be more concrete, the one of 150 to 250 mesh or so is preferable.

In addition, what is important in the high-density artificial stone of this invention is, except for special cases, that it is desirable that these material compositions are uniformly dispersed in every part of the product.

The external surface of the product in this invention is to be previously polished or roughened prior to the softening and deformation by heating. The reason for previously performing the surface fabrication like this is that there would be no necessity of performing surface fabrication at all after the softening and deformation.

Polishing is indispensable for causing the compact structure state which the high-density artificial stone with a deep feel of this invention to be surface-exposed. As the means for polishing, it is possible to use a grindstone, grind cloth, grind belt, etc., or an abrasive of buff abrasive, rubbing compound, etc.

As the abrasive material, diamond, boron carbonate, corundum, alumina, and zirconia which perform mainly grinding action, and tripoly, dolomite, alumina, chromium oxide, cerium oxide, etc. which perform mainly polishing action, are properly used.

In the roughening of the surface, it is permissible to do such that the surface of the small particle component is exposed to the surface, as a typical means, roughening fabrication by water jet with jetting high-pressure water is exemplified. According to need, it is permissible to treat by an organic solvent, partly remove the resin component, or scrape from the surface part the resin component with a low hardness by a wire brush, cutting means, etc.

And, in this invention, it is permissible to perform roughening fabrication previously so that the small particle component is exposed on the surface part.

As the method for this, at first, the selective removal method of the resin component is adopted. That is, for example, it is effective to perform surfacing fabrication by jetting high-pressure water to the surface of molded product after demolding from molding die.

This fabrication is not limitative because it differs depending on various conditions of thickness, distance from the nozzle, fabrication mode, etc. It is possible to make the water pressure 100 to 300 kg/cm$^2$. This water pressure condition is lower than in the case where natural stone is an object.

Thus, by the presence of the resin component, fabrication with high quality becomes possible more easily.

Regarding the nozzle and its system to jet high-pressure water, there are no specific restrictions. Those of various kinds are adopted.

By this surfacing fabrication, flattening or roughening by water jet is realized, with the texture of deep feel being possessed.

By the presence of the resin component, without the surface becoming whitened, and as compared with the etching method using chemicals, the disposal of waste liquid also becomes easy.

And, in the case of obtaining the artificial stone, it is important to make the intended natural stone exhibit desired color tone or design properties. Granite and marble are often made a target because it is difficult to obtain product from natural ones and the color and luster are beautiful. In this case, its color and luster are an important theme which determines the value of granite and marble. In natural granite and marble, there are various kinds of color itself from completely black one to white one, or red one, and its degree differs even for the same color. Hitherto, in the case of imparting a color to various kinds of artificial stone, for example, to obtain a black one, it is permissible to use only black ones of powdery or granular body of natural stone, etc., but to obtain the one of intermediate color tone, the reproducibility becomes a problem. And, even if a color is imparted, it was difficult to impart a unique luster which marble possesses.

For example, even in the case where a color was imparted by using a dyestuff or pigment, it was difficult in the past to impart a luster and depth.

On the other hand, in this invention, a transparent one is used as the small particle component. For example, when it is intended to obtain one which possesses a luster of granite-tone or marble-tone, etc., it is possible to use as the small particle component, small particles which are obtained by crushing quartz-based natural stone.

Small particles which are obtained crushing quartz-based natural stone have a surface with a unique smooth part because the raw material is quartz-based. Also in many cases, colorless and transparent. Even in the case of having colors which are not so strong, or not being transparent, those which retain some transparency are many.

If one uses this raw material, the color of the product obtained can be controlled by the coating layer of the small particle component and the color tone of the resin component. In addition, its color can impart depth and causes it to possess luster by the presence of the quartz-based small particle component of transparent properties.

For example, in the case of having the base layer of water glass containing white pigment or in the case of having the hardened layer of polyester-based unsaturated resin and in the case having used polyester-based unsaturated resin as the resin component, since the color the resin, possesses is in general, white containing some yellow shade, the product obtained becomes milky white with luster and it is possible to obtain a product of color tone very much resembling natural milky white marble.

By making the coating layer one which causes it to contain coloring material of pigment, dye, etc., in addition, by adding to the resin component inorganic pigment of titanium dioxide, zirconium silicate, manganese dioxide, iron oxide, cobalt oxide, etc., organic pigment of phthalocyanine pigment, etc., or various dyes, it is possible to have a uniform color, causing it to have a unique color tone with depth and luster.

Incidentally, in the artificial stone composition of this invention, it is possible to impart color to the product, by using colored particles of approximately the same size as the small particle.

In any event, it is possible to easily secure the reproducibility of color compared with conventional artificial stone, one superior in depth and luster without discoloration.

And, in the artificial stone of this invention, it is also particularly effective to apply glaze to color porcelain, etc., to the powdery granular body of the natural transparent small particle component, baking it into powdery granular body of desired color and using this as the small particle component. If one uses this method, not only is it possible to make the color a certain one but also it is possible to select widely.

If one uses the same colored particle size as that of the crushed quartz-based natural stone and the small particle component, and applies baked glaze to it, in the case of colors such as black or red, there is no anxiety at all regarding the reproducibility of color, the color to be reproduced is not merely color itself but even something like luster and color tone is reproduced. Therefore a product absolutely unobtainable by the conventional coloring system is realized.

In any event, the small particle component having formed the coating layer by this baking, is used in a ratio of 10 to 100% of the total small particle component.

And, taking the color tone into consideration, one may incorporate a short fiber component for the structural reinforcement of the molded item. For example, it is possible to use glass fiber, ceramics fiber, metal fiber, resin fiber, etc. Above all, glass fiber is exemplified as a preferable one.

These short fibers are, in general, those of about 10 to 100 $\mu$m in diameter, 1 to 10 mm in length are used in a ratio of 1 to 10 wt % or so of the small particle component.

Incidentally, the molding method for the plate-like forming body of the artificial stone used for this invention is broadly selected. For example, cast molding, compression molding, etc., are properly considered.

For example, in the compression molding method, to the lower receiving mold as the horizontal mold frame, casting material containing a mixture of the small particle component, fine particle component and resin and mixed as much as necessary, is added, the receiving mold is mated with the upper mold and pressed with a surface pressure of 5 to 100 kgf/cm$^2$, thereby performing compression molding. And in this molding, at the time of compression, one heats at a temperature of about 90 to 140° C. for about 5 to 20 minutes.

And, in this compression molding with heating, it is also possible to add vibration to the mold frame together with pressure, improve the flowability of the above-mentioned mixing material in the mold frame.

Below, an example is set forth. Of course, this invention is not restricted by the following examples.

EXAMPLES

Example 1

There is employed as 50 wt % of the total small particle component, natural silica stone of particle diameter 10 to 70 mesh provided in a thickness of about 30 $\mu$m, with the surface baking layer at about 1000° C., using white glaze. This small particle component and calcium carbonate of average particle diameter 230 mesh are employed in a weight ratio 2:1, so that it becomes 87 wt % of the composition total weight. This is uniformly mixed into a mortar state together with methyl methacrylate (MMA) of 11 wt % containing hardening agent of about 1.4 wt % of the methyl methacrylate (MKA) component.

This composition is cast into a mold frame and formed into a plate-like body of thickness about 11 mm.

Then, the surface part is polished using corundum abrasive material. By this, the small particle component having the baked coating layer is caused to be exposed at the partial cross section of its baked layer and the small particle component.

The resulting artificial stone, has a milky white color and luster of marble tone with depth, bubbles do not exist in the inside and surface, the composition was uniform.

In a test according to the Japanese Industrial Standard JIS K-7112, the specific gravity was 2.27 and water absorption was 0.12%. Other characteristic properties were as in Table 1 below.

TABLE 1

| Item | Results | Test condition |
| --- | --- | --- |
| Flexural strength | 31.30 kgf/cm | according to JIS A5209 |
| Compressive strength | 1400 kgf/cm$^2$ | Crosshead speed 0.5 mm/min load cell 2 ton |
| Impact strength | 4.56 kgfcm/cm$^2$ | Pendulum-type impact test |
| Hardness | 1021 kgf/mm$^2$ | Vickers hardness according to JIS Z-2244 |
| Coefficient of linear expansion | 0.54 (×10$^{-5}$K) | TMA (30 to 100° C.) |
| Wear resistance | 0.03 g | JIS A5209 sand dropping type wear resistance test |

And, anomaly was not recognized also by acid resistance, alkali resistance test by 3% hydrochloric acid aqueous solution 8 hours immersion and 3% sodium hydroxide aqueous solution 8 hours immersion.

The plate-like artificial forming body having done polishing as above underwent bending fabrication by the system illustrated in FIG. 1. The conditions at this time were as follows.

Plate-like forming body: thickness 10.5 mm, size 300×390 mm

Pedestal curvature radius: R 250 mm

Pedestal slope: 45°

Pressurized atmosphere: air

Pressure: 4–4.5 atms

Heating temperature: 160° C.

Heating: rising temperature 10 minutes (from 20° C. to 160° C.) maximum temperature hold 15 minutes (160° C.)

Falling temperature: falling temperature 10 minutes (from 160° C. to 80° C.) after that, natural falling temperature with the atmospheric pressure released.

Artificial forming body having a curved surface shape was obtained, local deformation or whitening was not recognized at all on the surface of this one. It was a high-quality artificial curved surface forming body.

Example 2

In Example 1, the sum of the small particle component and the fine particle component was made 90%, the resin component containing hardening agent of about 2 wt % in MMA component was made 10% and the thickness of the surface baking layer of the small particle component was made 20 μm.

Similarly to Example 1, mirror polish fabrication was performed, the resin component of the surface part was further removed by water jet pressure (pressure: 1200 kg/cm$^2$, nozzle diameter 0.8 mm, distance of nozzle 40 mm). High-quality artificial stone was obtained. It had characteristic properties of flexural strength 30.58 kgf/cm, compressive force 1385 kg/cm$^2$, hardness 1025 kgf/mm$^2$, had a superior surface with the depth of granite tone.

The curved surface molding was performed in the same way as in Example 1 to obtain the high-quality product in the same way.

Example 3

15% of the total amount of natural silica stone as the small particle component, had baked thereon blue glaze on a particle surface in a thickness of 25 μm.

Using one of this small particle components of 10 to 50 mesh, there was formed a plate-like body in the same way as in Example 1.

It was polished using a diamond and alumina-zirconia abrasive material.

A beautiful bluish white surface with depth was obtained.

Curved surface molding under the following conditions, obtained a high-quality product in the same way.

Plate-like forming body: thickness 15 mm, size 900×775 mm

Pedestal curvature radius: R 500 mm

Pedestal slope: 35°

Pressurized atmosphere: air

Pressure: 3.5 atms

Heating temperature: 145° C.

Heating: rising temperature 15 minutes (from 20° C. to 145° C.) maximum temperature hold 20 minutes (145° C.)

Falling temperature: 15 minutes (from 145° C. to 70° C.) after that, natural falling temperature with normal pressure recovered.

INDUSTRIAL APPLICABILITY

As above, in this invention, high-density artificial molded product of curved surface or deformed shape, having good characteristic properties and color tone with depth and luster not obtained in the past is proposed. Moreover, the production of a superior product like this becomes possible without being particularly expensive, because it does not at all need the step called curved surface polishing unlike the conventional method.

The product is one capable of being used as wall materials, flooring materials, pillars, etc., more widely than the natural article, as a high quality article with depth.

What is claimed is:

1. A method of manufacturing artificial stone having a curved surface or deformed shape, comprising the steps of:

a. installing a pedestal having a predetermined curved surface or a deformed shape in a pressurizable container in an inclined arrangement;

b. placing an artificial stone forming body, comprising an inorganic mixture, consisting of an inorganic small particle component and an inorganic fine particle component, being not less than 85 weight percent of a total weight of said artificial stone, and a resin component less than 15 weight percent of the total weight of said artificial stone, in said pressurizable container on said pedestal, wherein said inorganic small particle component has a size of 10 to 70 mesh and said inorganic fine particle component is capable of passing through a mesh having a mesh diameter of 100 mesh;

c. heating said artificial stone forming body in said pressurizable container on said pedestal to a temperature ranging from 120 to 200° C. under a pressurized atmosphere equal to or higher than three atmospheres so as to soften said artificial stone forming body and deform said artificial stone forming body to said predetermined curved surface or said deformed shape of said pedestal by said artificial stone forming body's own weight; and d. cooling said artificial stone forming body to a temperature not higher than 90° C.

2. The method of manufacturing artificial stone according to claim 1 in which all or a part of said inorganic small particle component has an inorganic or organic layer previously coated and hardened on its surface.

3. The method for manufacturing artificial stone according to claim 1 wherein said artificial stone forming body is supported by said pedestal at an angle of inclination θ of about 30 to 70° and a thickness of said artificial stone forming body is in the range of 5 mm to 30 mm.

4. The method for manufacturing artificial stone according to claim 1 in which the resin component is a methacrylic resin.

5. The method of manufacturing artificial stone according to claim 4 in which all of a part of inorganic small particle component, has an inorganic or organic layer previously coated and hardened on its surface.

* * * * *